United States Patent [19]
Schenk

[11] 3,861,004
[45] Jan. 21, 1975

[54] FLUSH HEAD PANEL FASTENER
[75] Inventor: Peter Schenk, West Islip, N.Y.
[73] Assignee: Dzus Fastener Co., Inc., West Islip, N.Y.
[22] Filed: Feb. 21, 1974
[21] Appl. No.: 444,333

[52] U.S. Cl.............. 24/204, 24/221 R, 24/221 A
[51] Int. Cl............................................. A44b 17/00
[58] Field of Search.......... 24/221 R, 221 A, 221 K; 24/204, 203

[56] References Cited
UNITED STATES PATENTS
| | | | |
|---|---|---|---|
| 2,527,408 | 10/1950 | Dzus | 24/221 A |
| 2,564,101 | 8/1951 | Dzus | 24/221 R |
| 3,584,350 | 6/1971 | Schenk | 24/221 K |

Primary Examiner—Bernard A. Gelak
Attorney, Agent, or Firm—Kane, Dalsimer, Kane, Sullivan and Kurucz

[57] ABSTRACT

A panel fastener for rigidly interengaging two members so that the resultant assembly contains a substantially flush exposed surface. Each of the members contains a row of holes adapted to be aligned with a row of holes in the other member. One of the members has an engaging surface for contact with the other member and has a receptacle portion extending therefrom. A row of cups is in the receptacle portion with every other cup in communication with a hole in the one member. A longitudinal pin is shiftably mounted in the one member and extends through the cups. A biasing element is in each cup not aligned with a hole and is retained in position by engagement with the pin. A stud element is adapted to extend through the aligned openings in the members and has a cam slot adapted to engage with the pin. Finally, the stud element is extendable entirely within the members from one side thereof so as to provide an exposed flush surface and is rotatable between an open and closed position so that when the stud is rotated to the closed position the pin will follow the cam slot and will bias the biasing element in each adjacent cup to retain the pin in the closed position and the members in rigid interengagement.

4 Claims, 6 Drawing Figures

FLUSH HEAD PANEL FASTENER

BACKGROUND OF THE INVENTION

Quarter-turn fastening devices have been used in many environments for many purposes. In general, the operation of use includes the engagement between a spiral cam slot in a stud element and a cam follower or pin in a receptacle assembly. The pin follows the cam slot upon a quarter turn rotation into a locked or closed position. To permit the relative movement of the pin along the spiral cam slot a resilient member is employed so that the axial movement can be achieved and also to apply a biasing force when the members are in the locked position to help maintain the members in the locked position in rigid interengagement.

In certain environments it is desirable to have a flush exposed outer surface when two panels are fastened together. Of course, this is of concern where spring housings and springs are employed to attain the necessary bias and locking forces for the fastener elements. This situation is apparent when considering fasteners of similar design such as that disclosed in U.S. Pat. No. 3,594,876.

Consequently, in particular environments where a flush exposed surface is required, it is advantageous to provide a structural design which incorporates the operative elements of the fastener assembly behind the exposed surface of the outer panel. The structure must be such so as to not detract from the advantages of a quarter-turn fastener employing a spiral cam slot and pin arrangement with a spring biasing element for achieving the necessary locking tension. In fact, any increase in production in locking tension would naturally be an asset as well.

SUMMARY OF THE INVENTION

With the above considerations in mind, it is among the primary objectives of the present invention to provide a fastener assembly of the quarter-turn type with a stud and receptacle arrangement. The interlocking feature is achieved by means of a spiral cam slot and pin arrangement with springs providing the necessary biasing tension for the locking structure. The fastener is designed so that the entire assembly is housed behind a flush exposed surface of two interengaged panels when locked thereby alleviating the necessity of projection of fastener portions above the exposed surface of the fastened elements. The object is to provide a flush exposed surface for use in particular environments when such a panel surface is desirable.

In summary, a panel fastener is provided for rigidly interengaging two members so that the resultant assembly contains a substantially flush exposed surface. Each of the members contains a row of holes adapted to be aligned with a row of holes in the other member. One of the members has an engaging surface for contact with the other member and has a receptacle portion extending therefrom. A row of cups is in the receptacle portion with every other cup in communication with a hole in the one member. A longitudinal pin is shiftably mounted in the one member and extends through the cups. A biasing element is in each cup not aligned with a hole and is retained in position by engagement with the pin. A stud element is adapted to extend through the aligned openings in the members and has a cam slot adapted to engage with the pin. The stud element is extendable entirely within the members from one side thereof so as to provide an exposed flush surface and is rotatable between an open and closed position so that when the stud is rotated to the closed position the pin will follow the element in each adjacent cup to retain the pin in the closed position and the members in rigid interengagement.

With the above objectives, among others, in mind reference is had to the attached drawings.

DESCRIPTION OF THE PREFERRED EMBODIMENT

Figure 1:
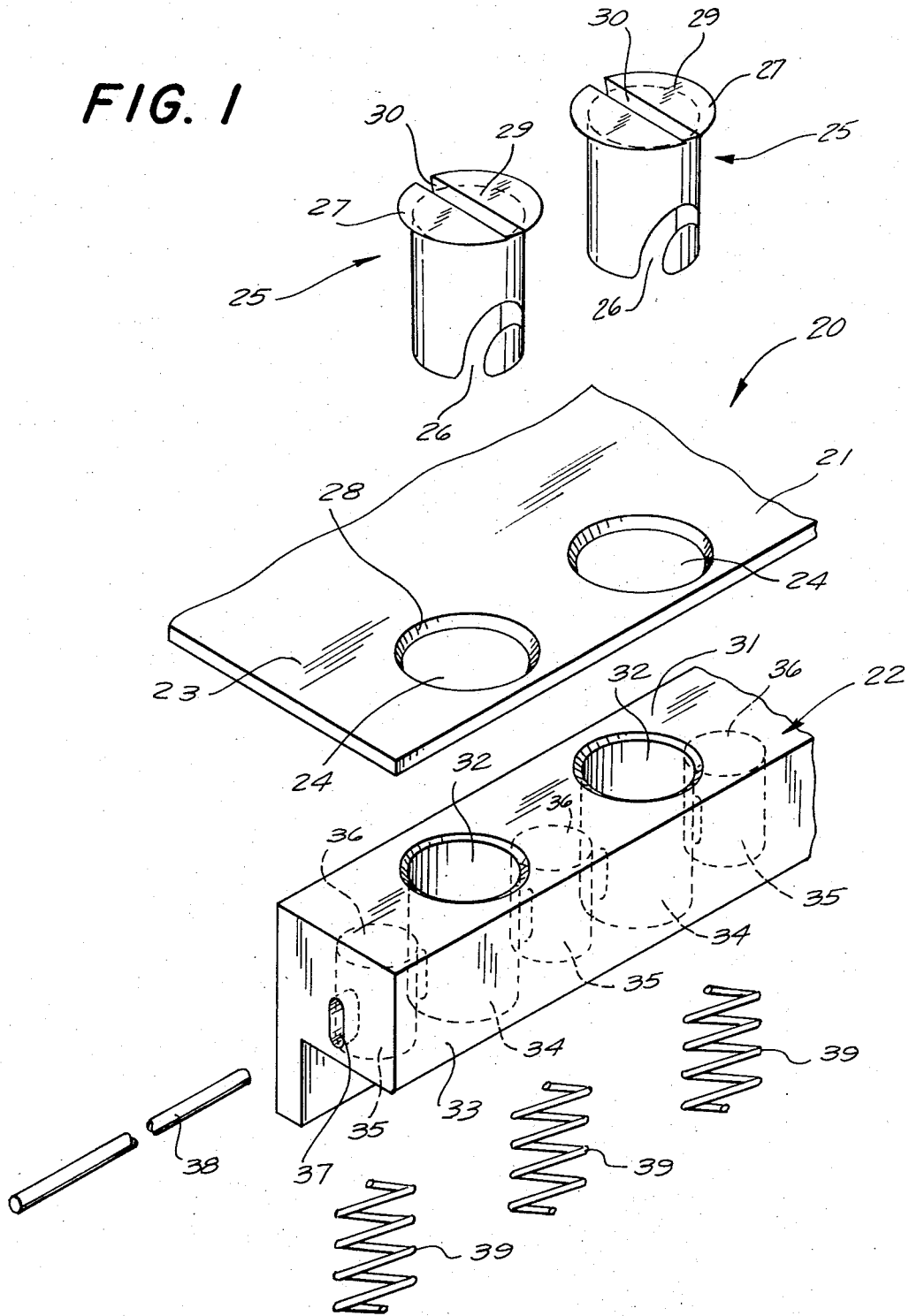
FIG. 1 is a fragmentary exploded view of the fastener assembly of the invention.
Figure 2:
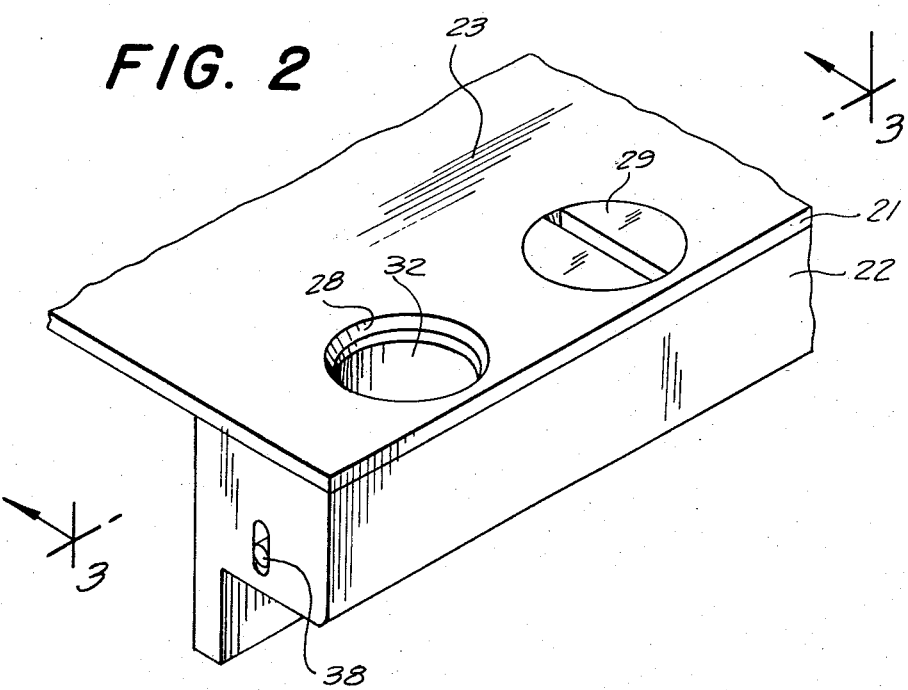
FIG. 2 is a prospective view thereof in partially assembled condition.

Panel fastener 20 is shown in its separated components in FIG. 1. Members 21 and 22 are generally at least portions of the two panel members being fastened together. Member 22 can be an extrusion or a plate which is mounted to another structural element to form a receptacle and support for the locking assembly. Member 21 can be a door or panel covering a compartment or may be a member or part of a member in other environments which can be readily envisioned where member 21 is to be fastened or locked to member 22.

The present fastener assembly 20 is designed so that one surface 23 of member 21 is designed for use as an exposed outer surface of the assembly. The environments envisioned are those where it is desirable or required to have surface 23 of a flush uninterrupted nature. The need for this surface may be for esthetic purposes or for structural purposes.

A row of spaced holes 24 are located in member 21 and extend therethrough. Each opening 24 is large enough to receive a stud 25.

Each stud 25 has a spiral cam slot 26 in the end which is initially extended through hole 24 and has a beveled rim 27 at its other end. The beveled rim 27 is designed to mate with a beveled annular surface on hole 24 so that the upper surface 29 of stud 25 is flush with surface 23 of member 21 when the stud is fully extended therein. Naturally, hole 24 is large enough to receive the stud shaft forward of beveled rim 27 therethrough. An appropriate slot 30 is provided in the top surface of the stud to permit engagement with a tool for rotation of the stud 25 between the locked and unlocked position.

Member 22 has an upper surface 31 for interengagement with the undersurface of member 21 and has a row of holes 32 therein positioned so that when members 21 and 22 are aligned holes 32 are aligned with holes 24.

Extending away from surface 31 is a base or receptacle portion 33 which contains a row of cups utilized in the locking function and to house the various components of the fastener assembly so as to facilitate the retention of all portions of the fastener assembly behind flush exposed surface 23.

Every other cup 34 is aligned with and communicates with opening 32 in surface 31 and accordingly with openings 24 in member 21 when members 21 and 22 are properly aligned. The remaining cups 35 are closed at the upper end 36. The lower end may be open or closed as desired and is shown open in the embodiment depicted.

A continuous slot 37 extends through receptacle portion 33 transversely and substantially parallel to upper surface 31. Slot 37 is elongated in the vertical direction. Each cup 34 and 35 has diametrically opposed openings which correspond in size to slot 37 and communicate therewith so that a continuous passageway extends through receptacle 33 and transversely or diametrically across each cup 34 and 35 throughout the length of member 22.

An elongated pin 38 extends entirely through slot 37 and consequently through each cup 34 and 35 in a transverse manner. As shown, pin 38 is substantially round in configuration and is of a slightly less diameter than the width of slot 37 so as to enable it to pass therethrough and permit it to be vertically shifted between the upper and lower limits of elongated vertical slot 37. Actually the pin may take other configurations as long as it can pass through slot 37 and can be shifted vertically a predetermined amount. The amount that pin 38 must be shifted depends upon the distance it must move in following cam slot 26 of stud 25.

Each cup 35 is provided with an interior chamber to house a helical compression spring 39 which forms a biasing element for the assembly. Naturally, other readily available and well known biasing elements can be employed in place of the helical compression spring 39 to achieve its function as described in detail below. The spring has an outside diameter which permits it to be inserted within the chamber of cup 35 and in substantially the relaxed position is captured between the closed upper surface 36 of cup 35 and transversely extending pin 38. A spring 39 is provided for each cup 35. Consequently, each cup 34 is provided with a cup 35 on both sides with a biasing element or spring 39 housed therein.

Figure 3:
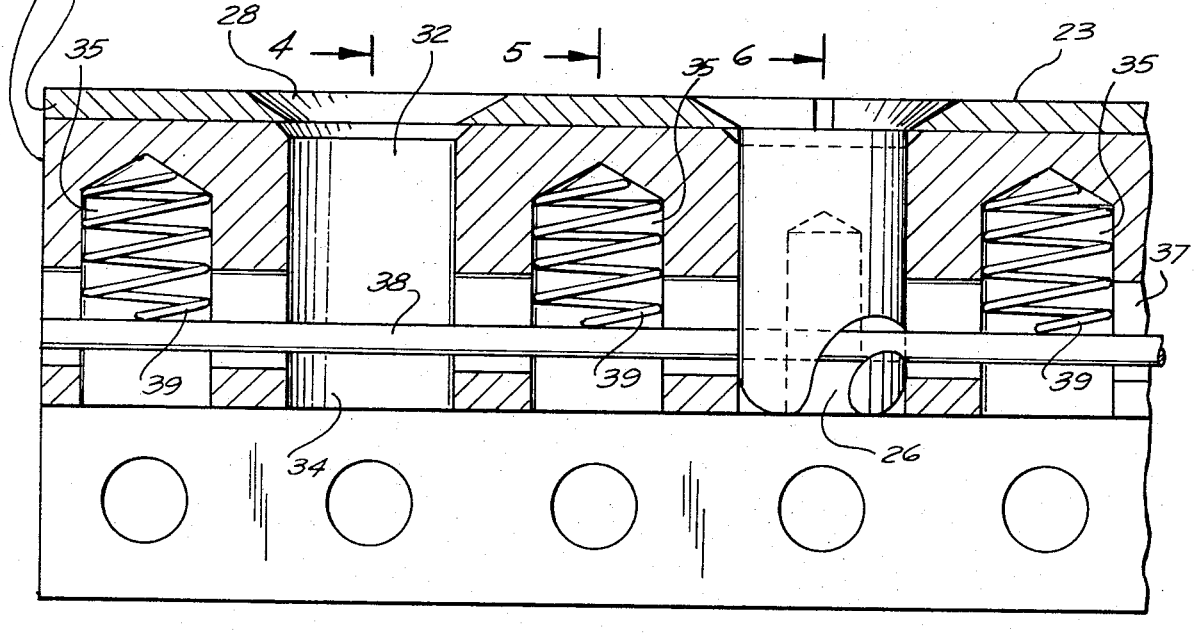
FIG. 3 is a sectional elevation view thereof taken along the plane of line 3—3 of FIG. 2.
Figure 4:
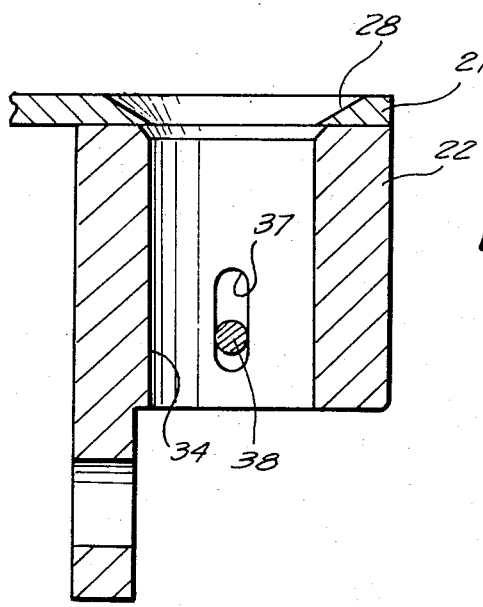
FIG. 4 is a sectional end view thereof taken along the plane of line 4—4 of FIG. 3.
Figure 5:
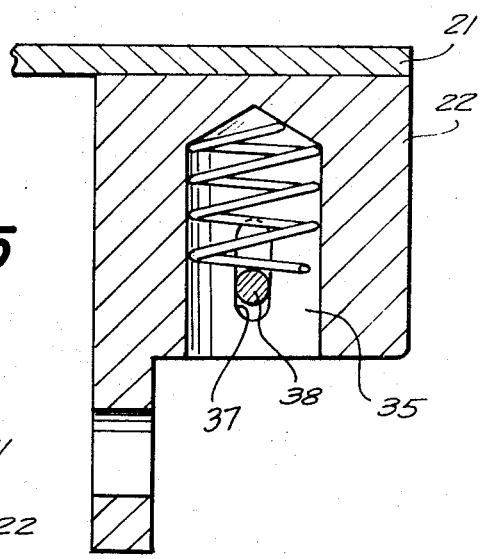
FIG. 5 is a sectional end view thereof taken along the plane of line 5—5 of FIG. 3.
Figure 6:
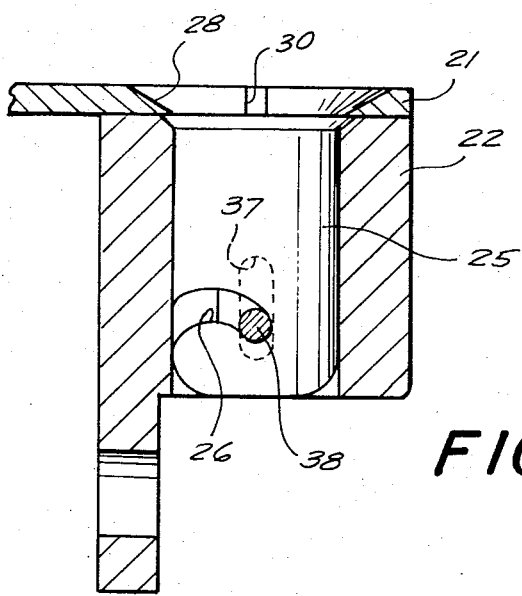
FIG. 6 is a sectional end view thereof taken along the plane of line 6—6 of FIG. 3.

In operation, member 22 is in the condition described above with springs 39 in substantially the relaxed condition and pin 38 adjacent the bottom of slot 37 within receptacle portion 24. Member 21 is then brought into alignment with member 22 for fastening purposes with openings 24 being aligned with openings 32. Studs 25 are then inserted through openings 24 and 32 into cups 34 and into engagement with appropriate transverse portions of pin 38. A rotation of stud 25 to the desired amount such as a quarter-turn will move pin 38 along the spiral cam slot 26 with slot 37 permitting movement of pin 38 the desired vertical amounts up and down until the pin reaches the end of the cam slot and is in locked position. In the locked position as shown in FIG. 3, springs 39 will be compressed a predetermined amount so that they apply a force in the vertical direction as they tend to expand to the relaxed position. This force is transmitted to the pin and tends to seat it more tightly in the locking position at the end of spiral cam slot 26. The result is a rigid interengagement between members 21 and 22 with pin 38 in the locked position in cam slot 26 and under the force exerted by biasing springs 39. In this position, the upper surface of stud 25 will be flush with exposed upper surface 23 of member 21 so that no portion of the fastener assembly is exposed above surface 23.

The unlocking procedure is quite simple in that an appropriate tool can be positioned in slot 30 and stud 25 can be rotated in the opposite direction one-quarter of a turn or whatever is needed until pin 38 has been directed along cam slot 26 and out of engagement therewith. Stud 25 can then be removed from members 21 and 22 which can then be separated as desired.

The number of studs employed for the locking action between members 21 and 22 is a matter of choice and depends, among other things, on the environment in which the assembly is to be used.

In the present fastener assembly 20, every three consecutive cups includes a central cup to receive a stud in engagement with the pin or wire 38 and each two adjacent holes have a biasing member or spring mounted therein in engagement with the pin and other surfaces within the receptacle portion. Consequently, when the stud is rotated and the pin is shifted to follow the cam slot in the stud, the resilient take-up of the axial movement of the pin within slot 37 will be absorbed by the two adjacent springs housed in the adjacent cups in member 22. Consequently, the top surface of the stud can be substantially flush with the exposed panel surface. Furthermore, it should be kept in mind that the number of studs required in the depicted embodiment is reduced since one is required only every other hole in member 22. Furthermore, the engagement has additional strength since two springs are employed to apply the holding force to the pin rather than just one.

Thus, the above discussed objectives of the present invention, among others, are effectively attained.

What is claimed is:

1. A panel fastener for rigidly interengaging two members so that the resultant assembly contains a substantially flush exposed surface comprising:
    each of the members containing a row of holes adapted to be aligned with a row of holes in the other member;
    one of the members having an engaging surface for contact with the other member and having a receptacle portion extending therefrom;
    a row of cups in the receptacle portion with every other cup in communication with a hole in the one member;
    a longitudinal pin shiftably mounted in the one member and extending through the cups;
    a biasing element in each cup not aligned with a hole and retained in position by engagement with the pin;
    a stud element adapted to extend through the aligned openings in the members and having a cam slot adapted to engage with the pin; and
    the stud element being extendable entirely within the members from one side thereof so as to provide an exposed flush surface and being rotatable between an open and a closed position so that when the stud is rotated to the closed position, the pin will follow the cam slot and will bias the biasing element in each adjacent cup to retain the pin in the closed position and the members in rigid interengagement.

2. The invention in accordance with claim 1 wherein the biasing member is a helical compression spring.

3. The invention in accordance with claim 1 wherein each cup contains a pair of opposed slots with each slot in communication with the adjacent slot of the next cup so as to provide a continuous through passage in the receptacle portion, each slot being vertical so that when the pin is extended therethrough it can be vertically reciprocated so as to bias and release the biasing member in response to engagement with the cam slot in the stud element.

4. The invention in accordance with claim 1 wherein the rim of the end of the stud opposite the end containing the cam slot has a beveled surface and each hole in the other member has a corresponding beveled surface so that when the stud is inserted through the members the beveled surfaces will mate to thereby provide a flush exposed surface for the assembly.

* * * * *